Sept. 7, 1965 J. J. SUNDAY 3,204,723
EXHAUST MUFFLER WITH FILLING OF POROUS CERAMIC CINDERS
AND METHOD OF MAKING SAME
Filed May 8, 1962 6 Sheets-Sheet 1

INVENTOR.
JAMES J. SUNDAY
BY
Barnes, Kisselle, Raisch & Choate
ATTORNEYS

Sept. 7, 1965  J. J. SUNDAY  3,204,723
EXHAUST MUFFLER WITH FILLING OF POROUS CERAMIC CINDERS
AND METHOD OF MAKING SAME
Filed May 8, 1962  6 Sheets-Sheet 2
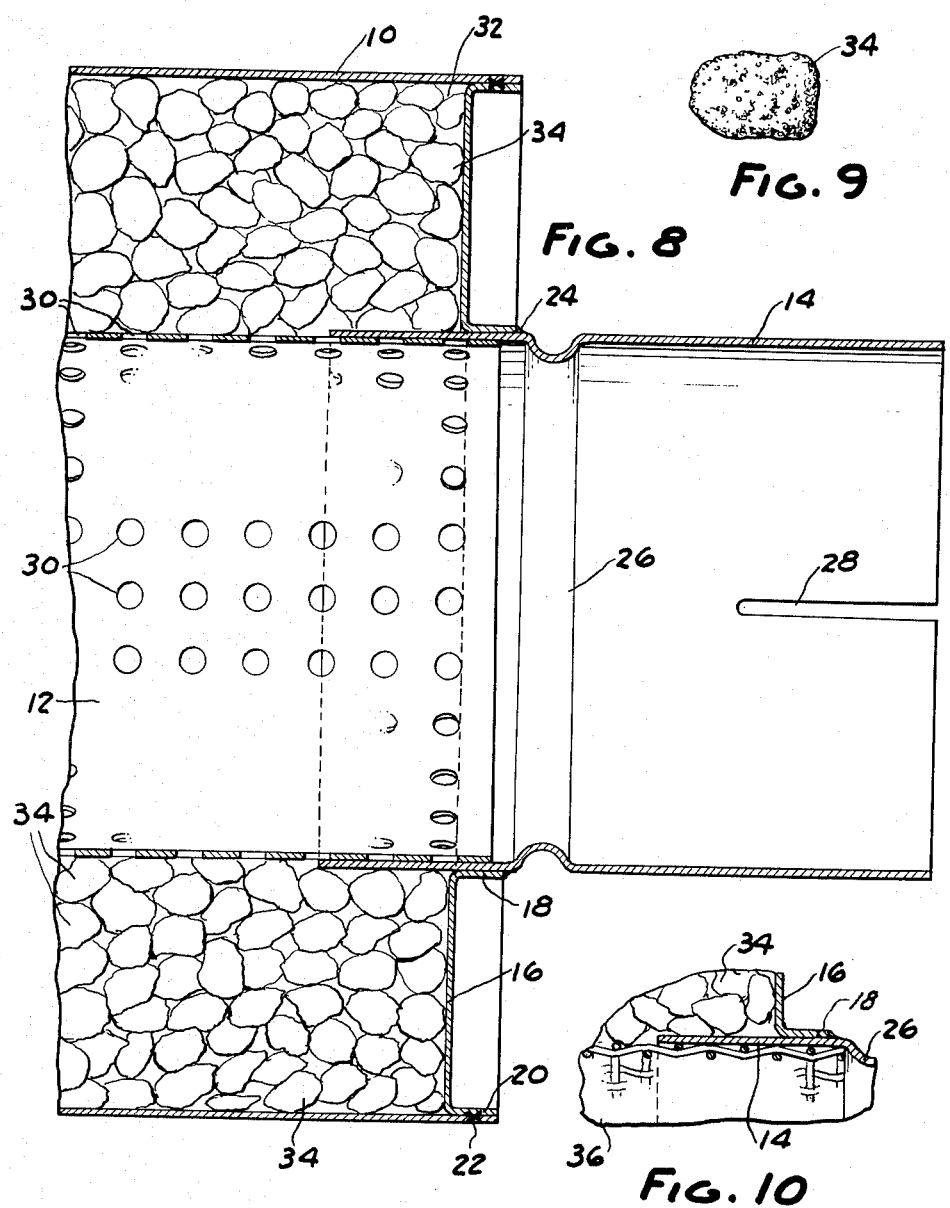
INVENTOR.
JAMES J. SUNDAY
BY
Barnes, Kisselle, Raisch & Choate
ATTORNEYS

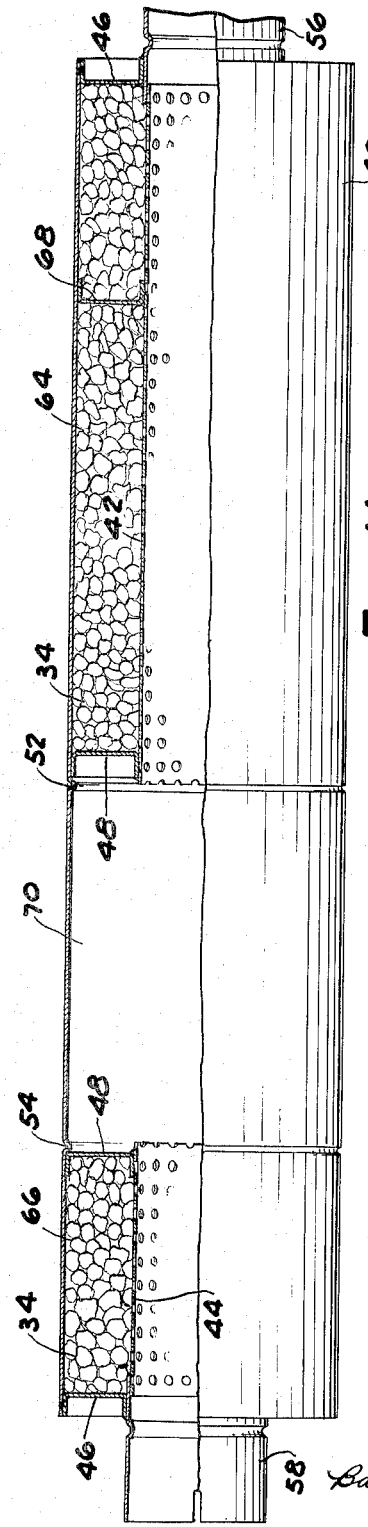
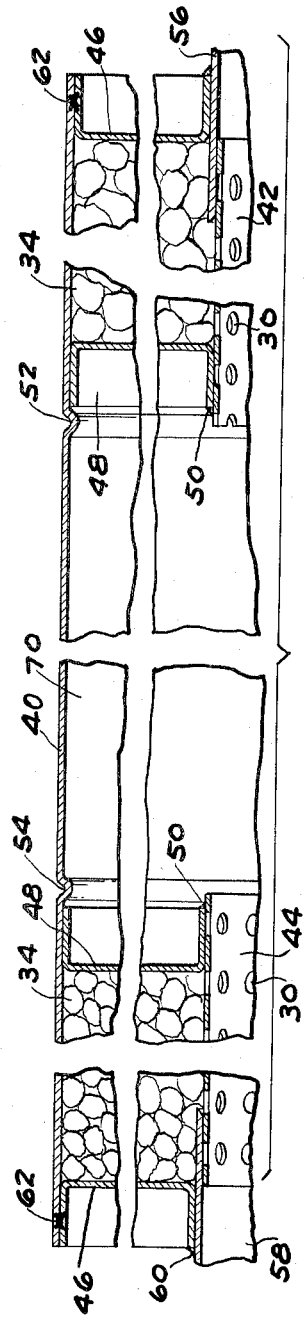

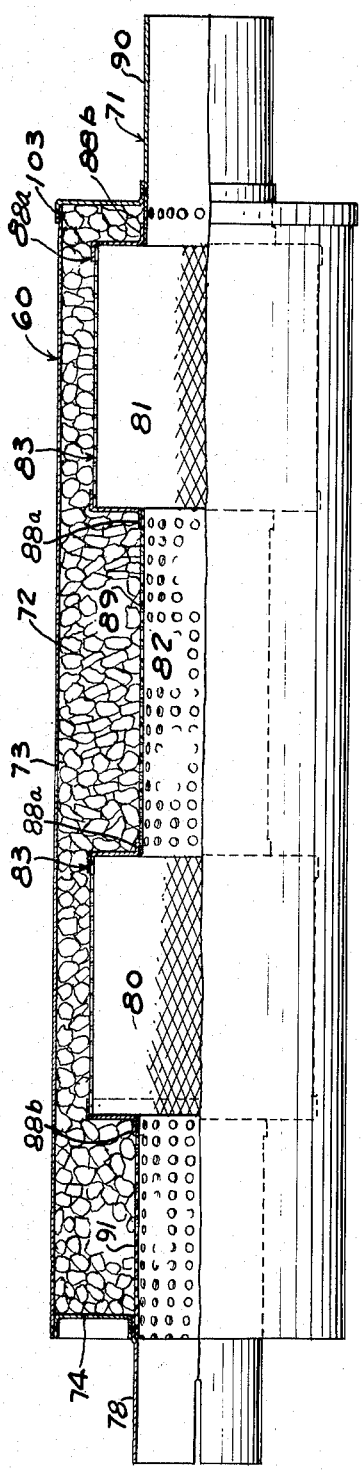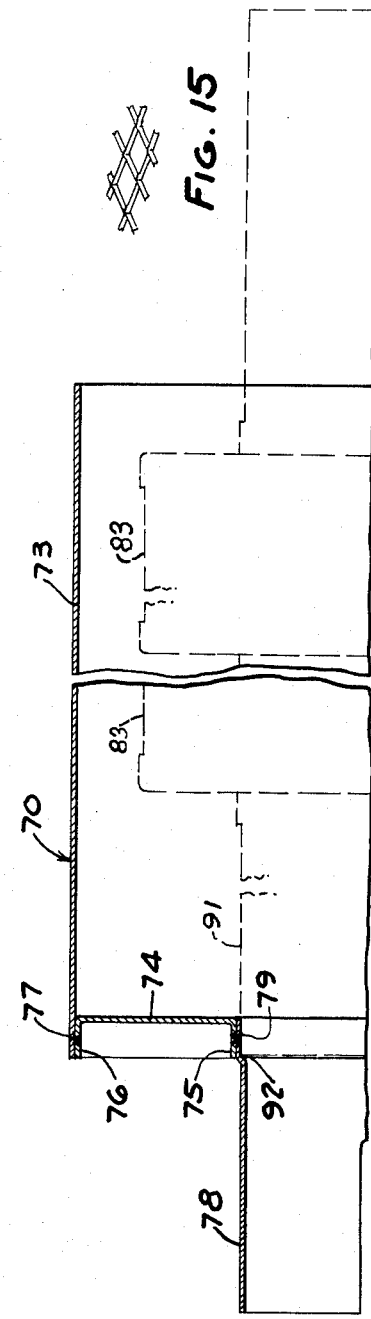

Sept. 7, 1965 J. J. SUNDAY 3,204,723
EXHAUST MUFFLER WITH FILLING OF POROUS CERAMIC CINDERS
AND METHOD OF MAKING SAME
Filed May 8, 1962 6 Sheets-Sheet 5
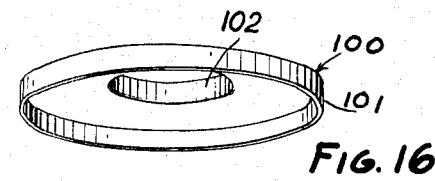
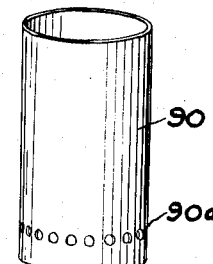
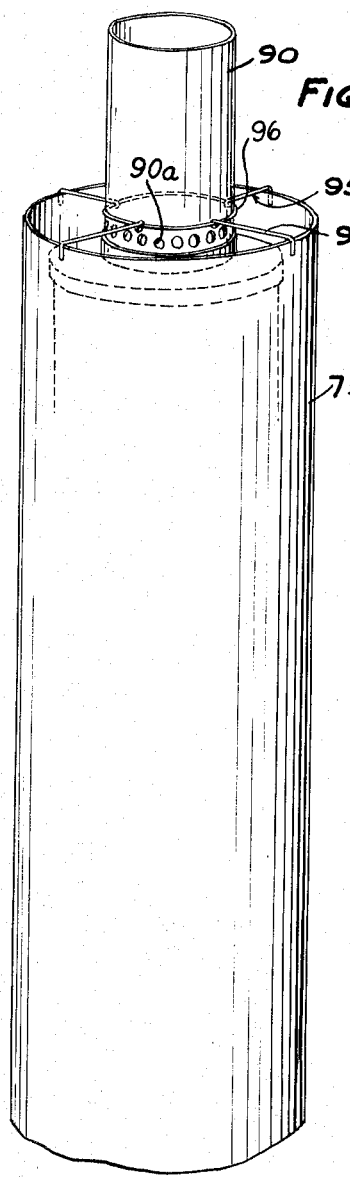
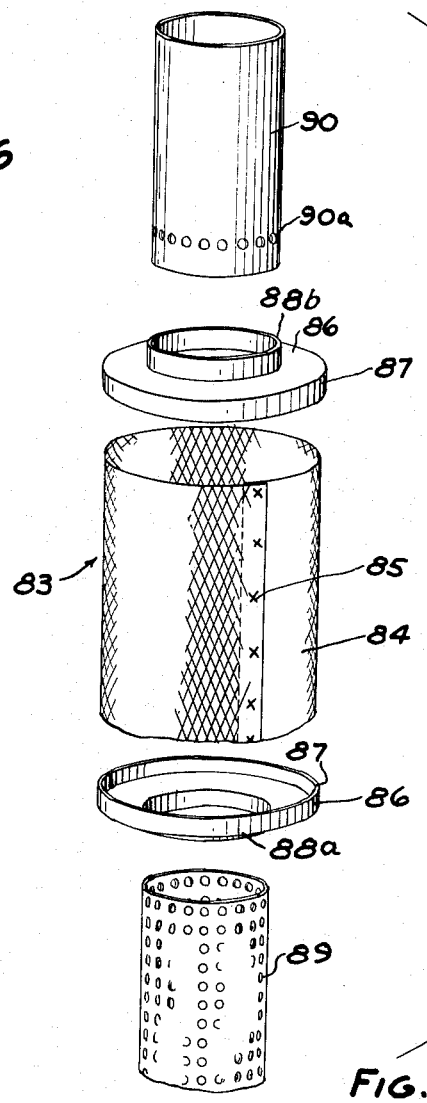
INVENTOR.
JAMES J. SUNDAY
BY
*Barnes, Kisselle, Raisch & Choate*
ATTORNEYS Sept. 7, 1965 J. J. SUNDAY 3,204,723
EXHAUST MUFFLER WITH FILLING OF POROUS CERAMIC CINDERS
AND METHOD OF MAKING SAME
Filed May 8, 1962 6 Sheets-Sheet 6
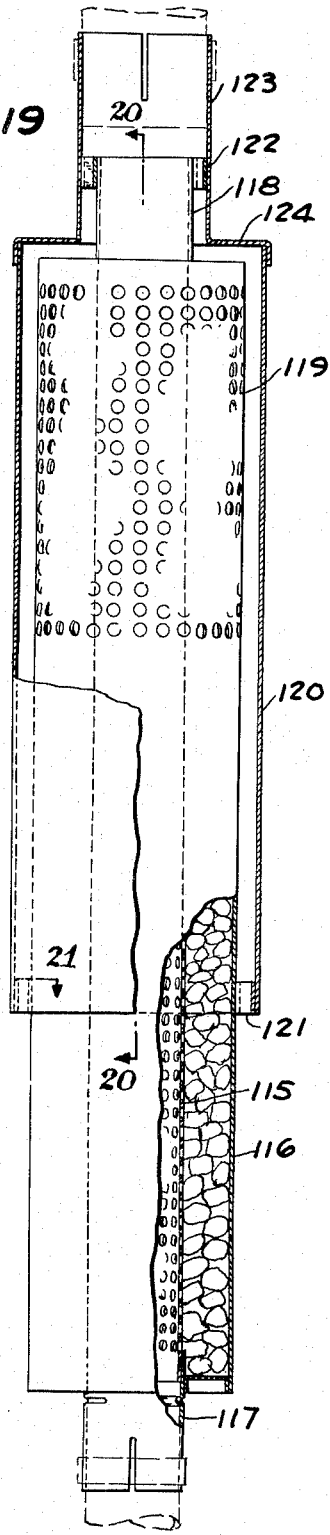
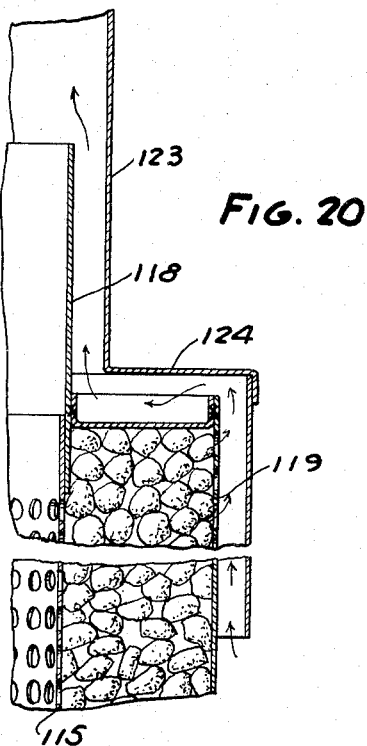
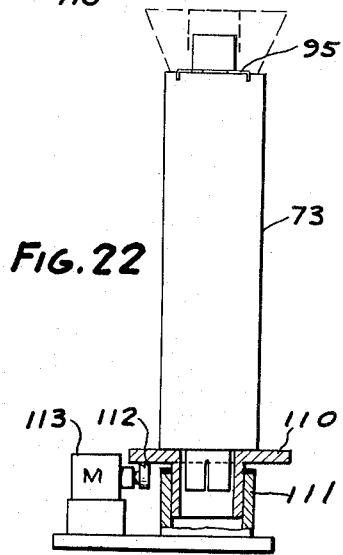
INVENTOR.
JAMES J. SUNDAY
BY
Barnes, Kisselle, Raisch + Choate
ATTORNEYS United States Patent Office 3,204,723
Patented Sept. 7, 1965

1

3,204,723
EXHAUST MUFFLER WITH FILLING OF POROUS CERAMIC CINDERS AND METHOD OF MAKING SAME
James J. Sunday, Denver, Colo., assignor to Natalie Payne, executrix of said James J. Sunday, deceased
Filed May 8, 1962, Ser. No. 195,653
3 Claims. (Cl. 181—50)

This application is a continuation-in-part of my application Serial No. 19,055, filed March 31, 1960, title Exhaust Muffler, now abandoned.

This invention relates to mufflers for noise producing gases and more particularly to mufflers for internal combustion engines.

The pressing need for an effective and efficient muffler for large internal combustion engines is evidenced by the fact that many small communities have been so disturbed by the noise produced by large trucks powered by diesel engines that they have restricted the travel of trucks through the communities to the daytime hours. The problem of exhaust noises is a serious one, and much effort has been directed to the solution of this problem.

The object of the present invention is to muffle the noise of the exhaust from an internal combustion engine in an efficient, simple and economical manner without creating substantial back pressure on the engine.

It is a further object of the invention to provide such a muffler which will operate at substantially cooler temperatures and with even less noise.

It is a further object of the invention to provide muffler which will substantially reduce and burn the soot which is normally formed and collected in the muffler.

It is a further object of the invention to provide a novel method of making such a muffler.

The present invention contemplates a muffler having an outer casing surrounding a perforated center tube with the space between the tube and the casing filled with a highly porous, ceramic cinder-like material, known commercially as "Clalite", of a particular type, size and weight. In another form, the improved exhaust muffler comprises providing a duct with a pair of axially spaced enlarged portions connected by a portion of reduced cross section and an outer casing surrounding all portions of the duct and being filled with the aforementioned porous ceramic cinders. The muffler is made in two basic sections to facilitate the filling of the muffler with the porous ceramic cinders. In a further form of the invention, a portion of the outer casing adjacent the outlet of the muffler is perforated and a second casing is provided surrounding the perforated muffler. In this form, a natural draft is provided between the outer casing and the second casing which induces sufficient outside air to cause the soot that normally would collect in the muffler to pass outwardly between the outer casing and the second casing and to burn adjacent the outlet of the muffler. According to the novel method hereinafter described, the muffler is filled with the porous ceramic cinders by placing it upright on a vibrating plate and introducing the cinders between the duct and the outer casing while the muffler is being vibrated.

2

Figure 1:
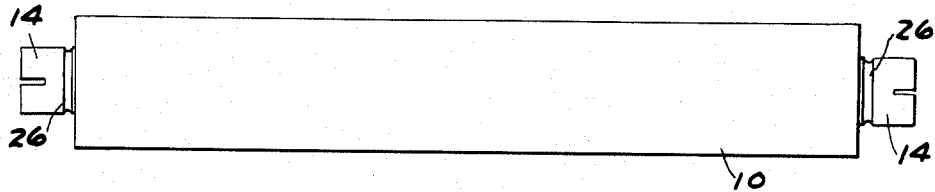
FIG. 1 is a side view of muffler according to the present invention.
Figure 2:
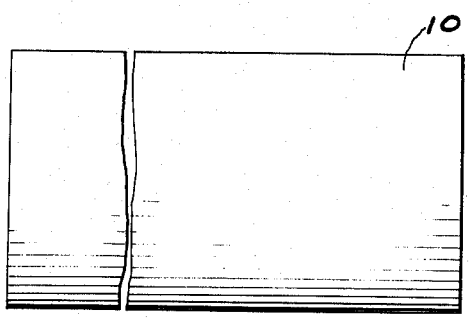
FIG. 2 is a side view partly broken away, on an enlarged scale, of the outer casing of the muffler.
Figure 3:
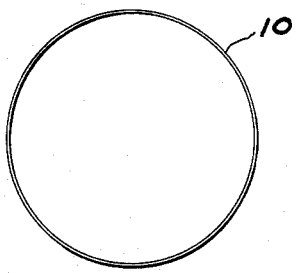
FIG. 3 is an end view of the outer casing of the muffler.
Figure 4:
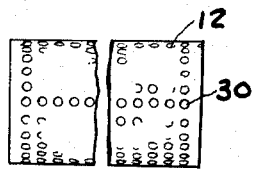
FIG. 4 is a side view partly broken away of the perforated central tube in the muffler.
Figure 5:
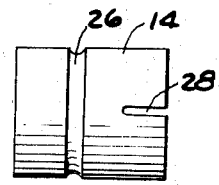
FIG. 5 is a side view of one of the tubular extensions at opposite ends of the muffler.
Figure 6:
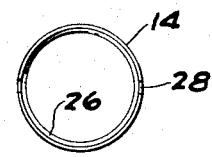

FIG. 6 is an end view of the tubular extension shown in FIG. 5.

Figure 7:
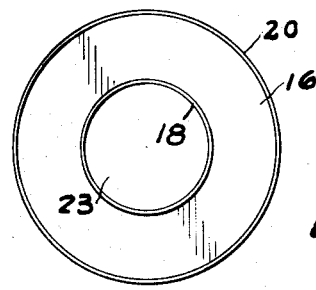

FIG. 7 is a plan view of a header at the opposite ends of the outer casing.

FIG. 8 is a fragmentary longitudinal sectional view on an enlarged scale of one end of the muffler.

FIGURE 9 is a view showing on an enlarged scale one of the ceramic cinders used in the muffler.

FIG. 10 is a fragmentary sectional view similar to FIG. 8 of the muffler showing a modified form of center tube.

FIG. 11 is a side elevational view partly in longitudinal section of a modified form of muffler according to the present invention.

FIG. 12 is a fragmentary enlarged longitudinal sectional view, parts being broken away, of the modified form of muffler shown in FIG. 11.

FIG. 13 is a part sectional side view of a modified form of muffler embodying the invention.

FIG. 14 is a fragmentary sectional view of a portion of the muffler shown in FIG. 13.

FIG. 15 is a fragmentary view of another portion of the muffler shown in FIG. 13.

FIG. 16 is a perspective view of an outside cap in the muffler.

FIG. 17 is a fragmentary perspective view showing the muffler in position for filling with the porous ceramic cinders.

FIG. 18 is a fragmentary exploded perspective view of another portion of the muffler prior to assembly.

FIG. 19 is a part sectional elevation of a further modified form of muffler.

FIG. 20 is a fragmentary sectional view taken along the line 20—20 in FIG. 19.

FIG. 21 is a fragmentary sectional view taken along the line 21—21 in FIG. 19.

FIG. 22 is a part sectional elevation showing an apparatus for filling the mufflers embodying the invention.

Referring to the drawings, particularly FIGS. 1 through 8, the muffler comprises an outer tubular casing 10 which may be formed of low carbon sheet steel and a center tube or duct 12 preferably formed of a corrosion-resistant material such as stainless steel. At each end of the muffler, there is telescoped over the ends of tube 12 a tubular extension 14. At the opposite ends of outer casing 10, the space between the casing 10 and the tube 12 is closed by a header 16. Each header 16 comprises an annular disk having inner and outer axially extending peripheral flanges 18 and 20. Headers 16 are secured to the outer casing 10 in any suitable manner, such as by spot welding the flange 20 around the ends of the casing as at 22. The diameter of the opening 23 formed by the inner flange 18 of header 16 corresponds generally with the outer diameter of extension 14 so that one extension 14 can be mounted at each end of the muffler by slipping it into the central opening 23 and welding it to the header 16 as at 24. The fit between tube 12 and each extension 14 is such as to permit relative axial movement therebetween so as to allow for differential expansion and contraction between the center tube 12 and casing 10. Each tubular extension 14 is preferably provided with a circumferential, inwardly extending rib 26. The two ribs 26 are spaced apart axially of the muffler a distance slightly greater than the length of tube 12 to thereby accommodate extension of the tube 12. The two extensions 14 are split axially at their outer ends as at 28 so that these extensions can be readily assembled with the manifold outlet pipe and tail pipe of a conventional exhaust system on an internal combustion engine.

As is clearly illustrated in FIG. 8, the center tube 12 is perforated throughout its length. The perforations, referenced 30, are preferably about 3/16" in diameter and their centers are spaced apart about 1/2". The perforations are arranged in rows both axially and circumferentially of tube 12.

The space between center tube 12 and outer casing 10, which is closed at each end by a header 16, forms an annular chamber 32 surrounding tube 12 which is filled with a particular sound absorbing material known commercially as "Clalite." This sound absorbing material consists of ceramic cinders which comprise the sintered product of a mixture of clay and pulverized coal. Materials generally of this type are disclosed in United States Patent Nos. 1,374,538, 2,360,929 and 2,544,752.

Clalite is made by mixing pulverized coal with a gray Wyoming clay in volume proportions of about 10% to 15% coal and 85% to 90% clay. I have found that up to 25% coal may be satisfactorily used for the purposes of the present invention. Water is added to the mixture to form a slurry or paste. The clay and coal slurry is heated to about 3000° F., at which temperature the coal burns out and leaves a porous ceramic clay cinder having open pores opening to a porous outer surface. In utilizing this cinder material for the sound absorbing material of the muffler, the sintered ceramic clay cinder is crushed and cinders of a particular size and specific gravity are selected for use in the muffler.

In selecting cinders of the proper size and weight for use in the muffler, the crushed mass is first passed over a screen, the mesh openings of which are three-quarter inch openings in the screen are permitted to fall into a water bath. Those cinders having a specific gravity less than 1 are floated onto a second screen, the mesh openings of which are one-quarter inch in size. The floated cinders which remain on the screen with the quarter inch openings are used for filling the chamber 32 of the muffler.

Thus, the cinders 34 which fill the chamber 32 vary in size from one-quarter inch to three-quarter inch in diameter and all of these cinders have a specific gravity less than 1. These cinders are very porous and have a rough, irregular outer surface as shown in FIG. 9.

I have found that the maximum sound absorbing ability of the muffler is obtained when the cinders 34 are selected as to size and weight as described and are relatively tightly packed in chamber 32. Thus, in assembling the muffler, one of the headers 16 with the extension 14 welded thereto is arranged within one end of the outer casing 10 and welded thereto as at 22. The center tube 12 is then slipped into the tubular extension 14 that has been secured in place on the casing and the chamber 32 is charged with the cinders 34 through the open end of casing 10. The tightly compacted condition of the cinders 34 is obtained by vibrating the muffler while it is being charged with cinders. The compacting action can be assisted by applying pressure axially against the charge of cinders from the open end of the casing 10. In the case of a muffler wherein the diameter of the outer casing 10 is 8" and the diameter of tube 12 is 4", a pressure of about 25 to 100 pounds tightly compacts the cinders 34 in the chamber 32 without crushing them. When the chamber 32 is fully charged with the cinders 34 in this manner, the other header 16 with the extension 14 welded thereto is slipped into the open end of casing 10 with the extension 14 telescoping over the end of tube 12 as illustrated in FIG. 8. Thereafter, the header 16 is welded to the outer casing 10 as at 22 and the assembly is completed.

In the modified construction illustrated in FIG. 10, the center tube 36 is formed from stainless steel wire mesh rather than sheet metal. The wire mesh tube 36 must possess sufficient rigidity and strength to withstand the packing of the cinders 34 around it and also the vibration and other abuse to which the muffler is put when in use. The spacing of the wires, that is, the size of mesh, will depend upon the size of wire used. The stainless steel wire may vary from about .040" to .080"; and with such wire sizes, the mesh will preferably vary from about 8 to 5 openings per inch, respectively. For example, when tube 36 is formed with a wire having a diameter of .065", the wire spacing is preferably such as to produce a screen having about a 6 mesh.

In FIGS. 11 and 12, there is shown another form of muffler according to the present invention. The muffler there illustrated comprises an outer casing 40 within which there are arranged two perforated center tubes 42 and 44. Tube 42 is substantially longer than tube 44. Tubes 42 and 44 are retained within outer casing 40 by means of headers 46 and 48. These header members are in the form of annular disks having inner and outer peripheral flanges similar to the header 16 shown in FIG. 8. The inner ends of tubes 42 and 44 may be welded to the inner flanges of headers 48 as at 50 (FIG. 12), in which case the outer casing 40 is provided with two inwardly projecting annular ribs 52 and 54 against which the headers 48 are arranged to abut. The outer ends of perforated tubes 42 and 44 have a slip fit within tubular extensions 56 and 58 at opposite ends of the muffler. Extensions 56 and 58 are secured to the outer headers 46 as by welding at 60 and the outer peripheral flanges of headers 46 can be spot welded around the ends of outer casing 40 as at 62 to complete the assembly. The two annular chambers 64 and 66 formed between the outer casing 40 and the two perforated tubes 42, 44 are filled with the ceramic cinders 34 of the type previously described. If tube 42 is very long in relation to its diameter, then it is advisable to insert an intermediate header 68 in annular chamber 64 between the two headers 46, 48.

In the arrangement shown in FIGS. 11 and 12, the tubular extension 56 forms an inlet fitting and the tubular extension 58 forms an outlet fitting for the muffler. The longer chamber 64 is preferably located adjacent the inlet of the muffler and the shorter chamber 66 adjacent the outlet of the muffler. The intermediate free chamber 70 between the two tubes 42, 44 has an axial dimension preferably equal to at least the length dimension of chamber 66.

Referring to the form of the invention shown in FIGS. 13 and 14, the muffler comprises an outer subassembly or section 70 and an inner subassembly or section 71 which is telescoped within the subassembly 70, the space between the two assemblies being filled with porous ceramic cinders 72, as presently described.

Referring to FIG. 14, the outer section 70 comprises a cylindrical casing 73 which may be formed of a low carbon sheet steel. A header 74 is positioned at one end of the casing 73 and comprises an annular disk having inner and outer axially extending peripheral flanges 75, 76. Flange 76 is secured to the inner surface of casing 73 in any suitable manner, such as by spot welding the flange 76 around the end of the casing as at 77. A tube 78 extends within the flange 75 of header 74 and is secured thereto as by welding at spaced points as at 79.

Referring to FIGS. 13 and 18, the inner section 71 comprises a duct which extends entirely through the outer section 70 and includes enlarged portions 80, 81 that are axially spaced and connected by a portion of reduced cross section 82. Portions 80, 81 are formed by cylinder assemblies 83. Each cylinder assembly 83 comprises a cylinder 84 made by bending a piece of expanded metal and welding the ends as at 85. Each cylinder assembly 83 also includes end caps 86 which have axial flanges 87 that are telescoped over the ends of the cylinder 84. The caps 86 on the inner ends of the cylinder assemblies 83 include axially extending flanges 88a that are telescoped over a perforated tube 89 that forms the reduced portion 82 of the duct.

The caps 86 on the outer ends of the assemblies 83 are provided with axial flange 88b. The flange 88b at the outer end of one casing is telescoped over a tube 90 that extends outwardly beyond the end of the casing 73. Tube 90 includes a row of perforations 90a therein in the space adjacent the casing 73. Flange 88b off the other casing 83 is telescoped over one end of a perforated tube 91. The outer end of the tube 91 extends within tube 78 and abuts a shoulder 92 as shown in FIGS. 13 and 14. All parts of inner section 71 are fastened to one another as by welding to form a rigid unit.

In assembly, the outer section 70 is held in vertical position as shown in FIG. 17 and the inner section 71 is telescoped downwardly within the section 70 bringing the tube 91 within the tube 78 into abutment with the shoulder 92. A wire locating device 95 which includes a circular portion 96 and radial arms 97 is telescoped over the tube 90 at the upper end of the section 71 to centrally locate the inner section 71 relative to the outer section 70. The porous ceramic cinders are then poured downwardly between the outer and inner sections, preferably while the sections are being vibrated, to fill the spaces between the inner and outer sections and tightly pack the cinders therebetween. After the space is filled, an outside cap 100 having an outer axial flange 101 and an inner axial flange 102 is provided over the tube 90 and end of the casing 73. The cap is secured in position as by welding at 103 to form the muffler. The flange 102 on the outer cap 100 is not secured to the tube 71 so that the inner section 71 can expand axially relative to the outer section 70 and thereby compensate for temperature differences between the inner and outer sections.

In order to more efficiently fill the space between the duct and the outer casing, the apparatus for vibrating may comprise a table 110 which is mounted for vertical movement in a base 111 by the action of an eccentric cam 112 driven by a motor 113. The muffler is placed in upright position on the plate 110, as previously described, and vibrated during the filling operation (FIG. 22).

In a muffler such as shown in FIGS. 13–16 which has produced satisfactory results, the following dimensions were used:

|  | Inches |
|---|---|
| Length of outer casing |  |
| Diameter of outer casing | 9 |
| Diameter of cylinder assembly | 7 |
| Length of cylinder assembly | 8 |
| Diameter of tubes 89, 90 91 | 4 |

In the form of the invention shown in FIGS. 19–21, provision is made for burning any soot which normally would pass outwardly through the outlet of the muffler. In the muffler shown, the perforated inner duct 115 is surrounded by the outer casing 116 with inlet 117 and outlet 118 extending from the lower and upper ends thereof respectively. In normal operation, the muffler is preferably supported vertically as, for example, on a diesel tractor which pulls trailers along the highway. The upper end of the outer casing is perforated as at 119, preferably for one third of the length thereof. A second imperforate casing 120 is provided surrounding the upper end of the casing, preferably for two thirds the length thereof and in spaced relationship thereto by clips 121 interposed between the second casing 120 and the outer casing 116 and clips 122 interposed between the outlet 118 and a tube 123 fixed to a cap 124 on the upper end of the second casing. In this fashion, a space is provided between the outer casing 116 and the second casing 120 which is open at the lower end and at the upper end. In use when the vehicle is moving along the highway, air is induced and caused to flow upwardly between the second casing 120 and the outer casing 116. This air draws the gases through the perforated inner duct 115, the porous ceramic cinders filling the space between the inner duct and the casing 116 and through the perforations 119. These gases carry with them any soot that tends to collect in the porous ceramic cinders and pass upwardly adjacent the outlet 118. At this point, the gases with the induced air meet the hot gases passing through the muffler which also include soot from the exhaust and the soot is there burned so that substantially no soot passes to the atmosphere.

Experience has shown that mufflers constructed in accordance with the present invention reduce the noise produced by the exhausts of large internal combustion engines to a very tolerable level. The sound absorption properties of the muffler can be attributed to a major extent to the use of the tightly packed ceramic cinders 34 in the annular chambers of the mufflers. These "Clalite" cinders, as previously described, are selected such that they have a specific gravity of less than 1 and vary in size from about one-quarter to three-quarter inch in diameter. In muffler constructions of the type described, Clalite cinders of the type described provide a mass of material which very effectively absorbs the noise of the exhaust gases and at the same time maintains the outer casing of the muffler relatively cool. As a matter of fact, during operation of the engine, the outer casing of a muffler in accordance with the present invention remains cool enough to touch with the bare hand. Accordingly, the outer casing need not be formed of an expensive corrosion-resistant material such as stainless steel.

In the form shown in FIGS. 13–16, the provision of the cinders around all portions of the duct, both sides and ends further absorbs the noise and maintains all portions of the outer surface of the muffler sufficiently cool that they may be touched by hand.

I claim:
1. A muffler for hot, noise producing gases such as exhaust gases from an internal combustion engine comprising
   a generally cylindrical casing,
   a central duct within said casing through which the noise producing gases are adapted to be conducted,
   all portions of said duct throughout its length being spaced from the cylindrical wall of the casing to define an annular chamber therebetween,
   said duct being formed of a foraminous material,
   said chamber being packed with porous ceramic cinders which comprise the sintered product of a mixture of 10–25% pulverized coal and 90–75% by volume, clay,
   said cinders having open pores opening to a porous outer surface and a specific gravity of less than one,
   a portion of said casing adjacent one end thereof being perforated,
   a second casing spaced from and surrounding said first casing throughout the perforated portion thereof,
   said duct having an inlet communicating with one end thereof and an outlet communicating with the other end thereof adjacent the perforated portion of the outer casing,
   and a tube surrounding the outlet and connected with said second casing to define a space extending from between the perforated portion of the outer casing and the second casing and between the outlet and the tube.

2. A muffler for hot, noise producing gases such as exhaust gases from an internal combustion engine comprising
   a generally cylindrical casing,
   a central duct within said casing through which the noise producing gases are adapted to be conducted,
   all portions of said duct throughout its length being spaced from the cylindrical wall of the casing to define an annular chamber therebetween,
   said duct being formed of a foraminous material,
   said chamber being packed with porous ceramic cinders which comprise the sintered product of a mixture of 10–25% pulverized coal and 90–75% by volume, clay,
   said cinders having open pores opening to a porous outer surface and a specific gravity of less than one,
   a portion of said casing adjacent one end thereof being perforated,
   a second casing spaced from and surrounding said first casing throughout the perforated portion thereof, said duct having an inlet communicating with one end thereof and an outlet communicating with the other end thereof adjacent the perforated portion of the outer casing,
a tube surrounding the outlet and connected with said second casing,
and a transverse wall extending between the tube and the second casing to define a space extending from between the perforated portion of the first casing and the second casing to between the outlet and the tube.

3. A muffler for hot, noise producing gases such as exhaust gases from an internal combustion engine comprising
a generally cylindrical casing,
a central duct within said casing through which the noise producing gases are adapted to be conducted,
said duct having a central portion of reduced cross section,
all portions of said duct throughout its length being spaced from the cylindrical wall of the casing to define an annular chamber therebetween,
said duct being formed of a foraminous material,
said chamber being packed with porous ceramic cinders which comprise the sintered product of a mixture of pulverized coal and clay,
said cinders having open pores opening to a porous outer surface and a specific gravity of less than one,
a portion of said casing adjacent one end thereof being perforated,
a second cylindrical casing spaced from and surrounding said first casing throughout the perforated portion thereof,
said duct having an inlet communicating with one end thereof and an outlet communicating with the other end thereof adjacent the perforated portion of the outer casing,
and a cylindrical tube surrounding the outlet and connected with said second casing to define a space extending from between the perforated portion of the outer casing and the second casing and between the outlet and the tube.

References Cited by the Examiner

UNITED STATES PATENTS

| 1,754,003 | 4/30 | Johnson-Vea et al. | 53—126 X |
|---|---|---|---|
| 1,968,456 | 7/34 | Kliefoth. | |
| 2,065,343 | 12/36 | Moore et al. | |
| 2,087,550 | 7/37 | Rice | 181—33.11 |
| 2,131,001 | 9/38 | Procknow | 181—59 |
| 2,264,524 | 12/41 | Hale | 29—157 |
| 2,331,325 | 10/43 | Jensen | 29—157 |
| 2,331,344 | 10/43 | Powers | 29—157 |
| 2,583,366 | 1/52 | Engels | 181—42 |
| 2,624,418 | 1/53 | Bourne | 181—61 X |
| 2,654,136 | 10/53 | Harford et al. | 252—62 X |
| 2,705,541 | 4/55 | Finch. | |
| 2,824,619 | 2/58 | Bremer et al. | |
| 2,929,462 | 3/60 | Nowak | 181—42 |

FOREIGN PATENTS

| 495,576 | 11/38 | Great Britain. |
|---|---|---|
| 504,653 | 12/54 | Italy. |
| 222,029 | 9/42 | Switzerland. |
| 290,699 | 8/53 | Switzerland. |

LEYLAND M. MARTIN, *Primary Examiner.*

LEO SMILOW, *Examiner.*